March 23, 1926.

J. CHVOJKA

HAND TRUCK

Filed May 23, 1925    3 Sheets-Sheet 1

1,577,954

INVENTOR
Joseph Chvojka
By W. W. Williamson
Atty.

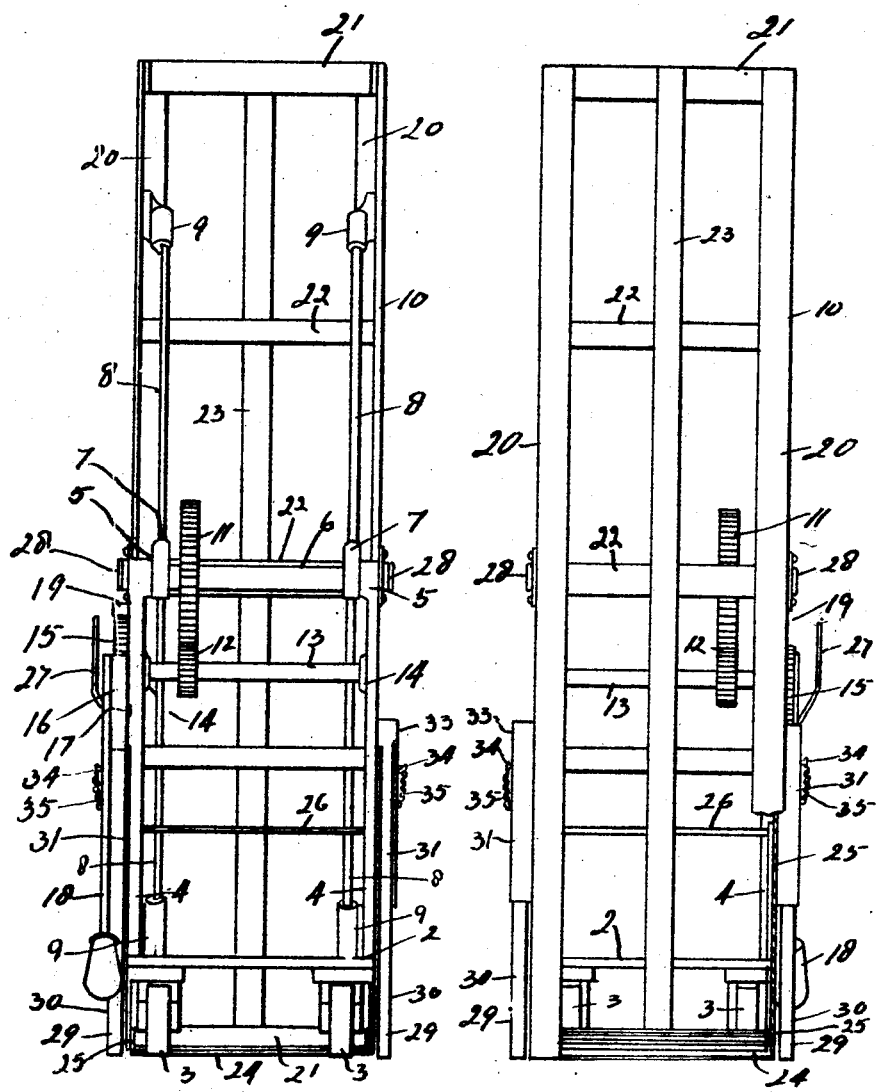

Patented Mar. 23, 1926.

1,577,954

UNITED STATES PATENT OFFICE.

JOSEPH CHVOJKA, OF PHILADELPHIA, PENNSYLVANIA.

HAND TRUCK.

Application filed May 23, 1925. Serial No. 32,296.

*To all whom it may concern:*

Be it known that I, JOSEPH CHVOJKA, a citizen of the United States, residing at Philadelphia, in the county of Philadelphia and State of Pennsylvania, have invented new and useful Improvements in a Hand Truck, of which the following is a specification.

My invention relates to new and useful improvements in a hand truck, and has for its primary object to provide a device of this character for receiving articles, such as bags of flour or the like, in endwise alignment, conveying said articles from one location to another without the weight thereof being sustained by the operator, for setting said articles in upright position, one on top of another so that they shall be stacked when the truck is withdrawn.

Another object of my invention is to provide a platform adjustably mounted upon a truck body whereby said truck body may be moved to different positions to carry out the operations set forth above.

A further object of the invention is to provide an adjustable toe piece for the platform whereby it may be readily withdrawn when the truck is to be unloaded or during the unloading operations.

Other objects will be apparent from the description as to the construction and operation of the device set forth below.

With these ends in view, this invention consists in the details of construction and combination of elements hereinafter set forth and then specifically designated by the claims.

In order that those skilled in the art to which this invention appertains, may understand how to make and use the same, I will describe its construction in detail, referring by numerals to the accompanying drawings forming a part of this application, in which:—

Fig. 3, is a rear end view of the same.

Fig. 4, is a front end view with a portion broken away to illustrate certain details of construction.

Figure 1:
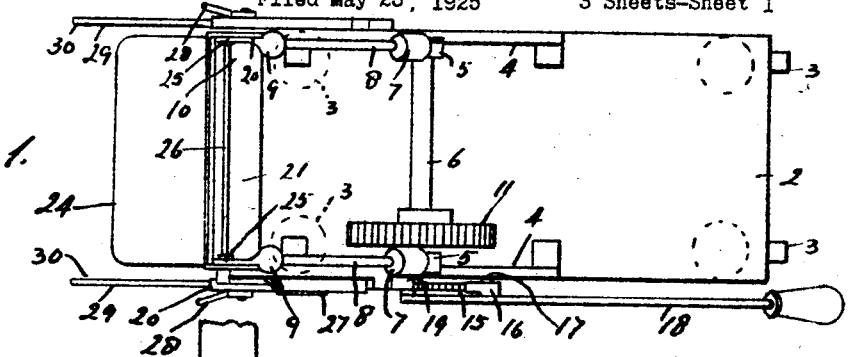
Fig. 1, is a plan view of a hand truck constructed in accordance with my invention with the platform in an upright position.

In carrying out my invention as here embodied, 2 represents a suitable truck body mounted on wheels or casters 3 of that type which will adjust themselves to the direction of travel desired by the operator of the truck and on this truck body are mounted suitable supports 4 provided with bearings 5 at their upper ends for the shaft 6 having multiple sockets 7 fixed to the ends thereof for the reception of rods 8 or their equivalents which rods are also set in sockets 9 carried by the platform 10.

The shaft 6 is rotatable in its bearings 5 and in order to rotate said shaft a suitable gear 11 is fixed thereon and meshes with a pinion 12 on the countershaft 13 rotatably mounted in bearings 14 carried by the frame members 4 below the bearings 5 and on one end of the countershaft 13 is a double ratchet wheel 15 adapted to be engaged by either end of the double pawl 16 pivotly connected as at 17 with the operating handle 18 which latter is rotatable on the end of the countershaft 13.

From the foregoing description it will be seen that by setting the double pawl 16 in the proper direction and then moving the handle 18 up and down the ratchet wheel 15 will be actuated to rotate the countershaft 13 and therefore transmit motion through the gears 12 and 11 through the shaft 6 so as to move the platform 10 into different adjusted positions in the arc of a circle about the axis of the shaft 6 and in order to prevent retrograde movement of the platform 10 a double end ratchet dog 19 is pivoted to one of the frame members 4 adjacent the ratchet wheel 15 so as to cooperate therewith.

Figure 2:
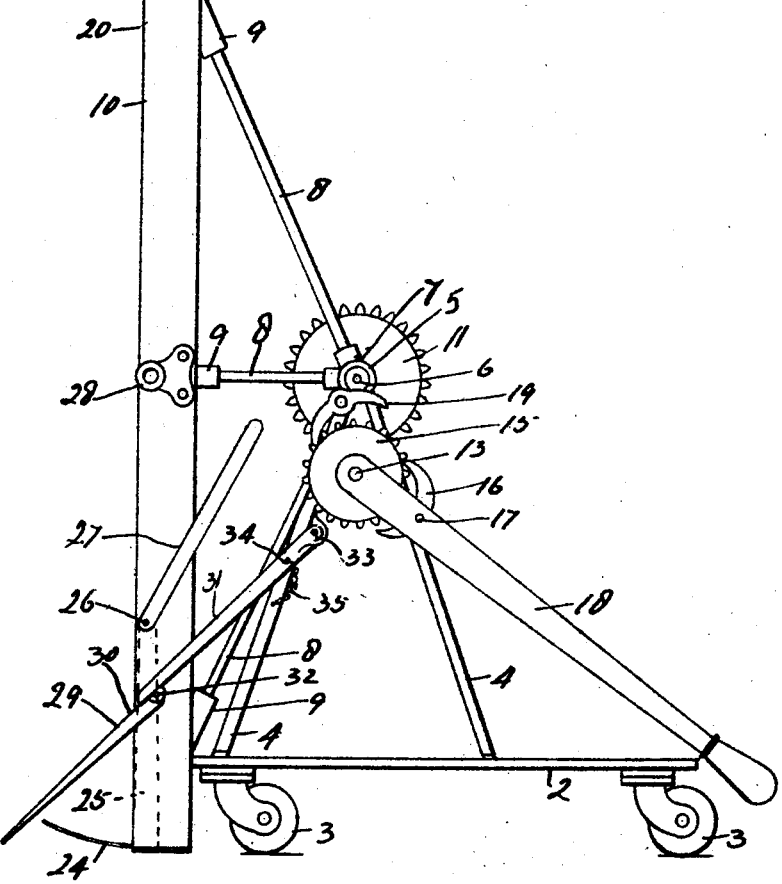
Fig. 2, is a side elevation thereof.

The platform 10 is considerably longer than the truck body 2 although it is not limited to any particular length but the parts are so arranged that when said platform is moved to an upright or vertical position, as shown in Fig. 2, the end thereof should reach or come to a point in close proximity to the surface on which the truck rests so that when the truck is withdrawn from the articles transported to the place of stacking the lowermost one of said articles will drop to the surface without falling any great distance. The platform 10 may be constructed in any desirable way although I prefer to use sides 20 formed from angle irons to which are secured the ends 21 and intermediate cross pieces 22 with a center strip 23 parallel with and intermediate the sides 20.

Figure 5:
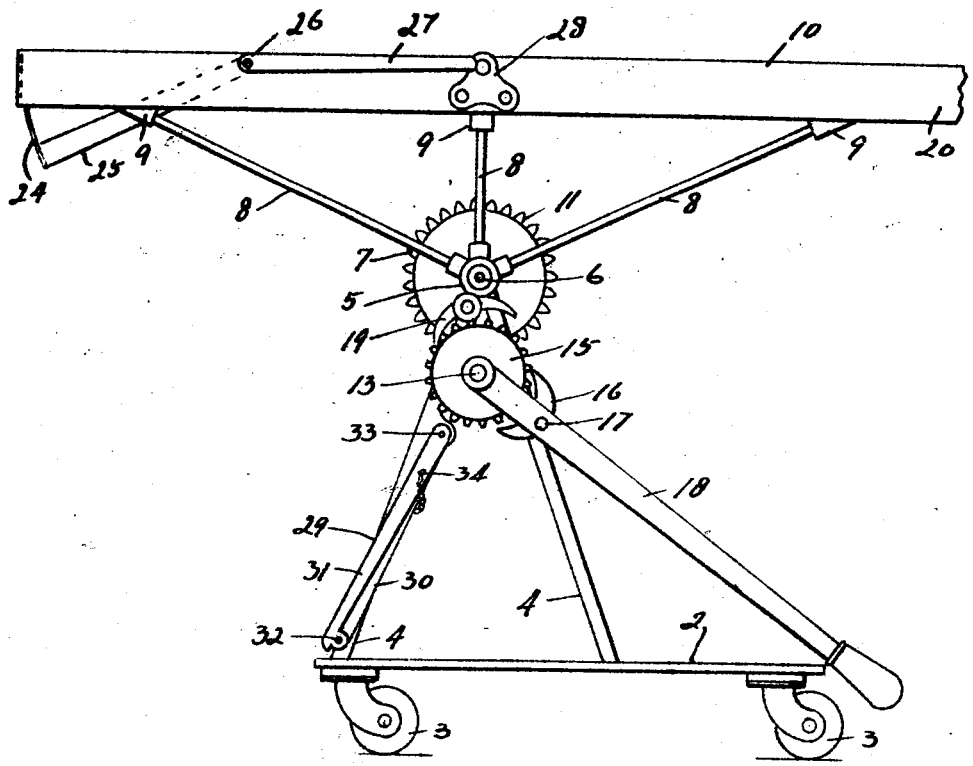
Fig. 5, is a side elevation with the platform in a horizontal position, showing the toe piece drawn out and the brace folded as when the truck is to be moved from one place to another.

Either one or both ends of the platform 10 may be provided with an adjustable toe piece but for convenience of illustration I have shown a toe piece only at one end which includes a foot 24 having a leg 25 at each side and the inner ends of these legs are fixed to a shaft 26 having its ends passing through and journalled in the sides 20 of the platform and on one of the projecting ends of this shaft 26 is fixed a handle 27 whereby the toe piece may be actuated to move it to an inoperative position as shown in Fig. 5, or to the operative position shown in Fig. 2. When the toe piece is in the position shown in Fig. 2 articles on the platform will be held in a given position thereby but when it is desired to remove the articles or withdraw the truck from said articles after they have been raised to an upright position the handle 27 may be actuated to throw the toe piece into an inoperative position, as shown in Fig. 5, thus withdrawing the foot piece 24 thereof from beneath the articles.

If found desirable cleats 28 may be secured to the sides of the platform so that a chain or other securing means may be fastened thereto in order to hold large articles such as barrels or hogsheads securely upon the platform during the transportation thereof.

In order to prevent the truck from tipping during the unloading process or at the time the platform is being moved from the horizontal to the vertical position or vice versa I provide a foldable brace or strut 29 here shown as comprising two members 30 and 31 pivoted together as at 32 in such manner that one end of the member 31 overlaps the member 30 a sufficient distance to prevent collapse in one direction and one end of this strut is pivoted as at 33 to one of the frame members 4. In order to hold the strut in some position such as shown in Fig. 2, a pin 34 may be utilized and passed through suitable holes in the strut member 31 and one of the frame members 4 and this pin can be secured to a chain 35 attached to the frame member. When the brace or strut is not in use the same is folded by first raising the outer free end thereof and then swinging the member 30 backward and upward against the member 31 after which said strut can hang free from its pivot point 33 or the chain 35 can be wrapped around the two members of said strut to prevent swinging thereof.

This truck is particularly adapted for use where bags of grain, flour and the like are to be transported from the receiving point to a place of storage in a building and as an example to illustrate its usefulness it will be considered in connection with the storing of flour in a bakery. The flour is shipped to the bakery in railroad cars or automobile trucks and unloaded onto a chute entering the building so that by moving the truck to a point adjacent the delivery end of the chute and inclining the platform 10 until one end will align with the end of the chute the bags of flour will readily slide onto the platform 10 one at a time so as to be in endwise alignment.

After the truck has been loaded it may be moved about with the platform in an inclined position or said platform may be moved to a horizontal position so that the weight of the flour will be properly distributed upon the truck and will require no effort on the part of the operator to maintain the truck in an upright position. When the truck has been moved to the place where the bags of flour are to be stored or stacked the platform is moved into the vertical position, as shown in Fig. 2, and the truck then moved until the bags on the platform are against other bags or the wall of the building and upon withdrawal of the toe piece of the foot 24 from beneath the bags the lowermost one thereof will rest upon the ground or surface supporting the truck. As there is then no weight upon any part of the truck the later may be moved away while leaving the bags standing in a stacked position.

Of course I do not wish to be limited to the exact details of construction as herein shown as these may be varied within the limits of the appended claims without departing from the spirit of my invention.

Having thus fully described my invention, what I claim as new and useful is:—

1. A hand truck including a wheel supported body, frame members on said body, bearings at the upper ends of said frame members, a shaft journalled in said bearings, a countershaft also journalled in bearings on said frame members, a gear on the first mentioned shaft, a pinion on the countershaft meshing with said gear, a ratchet wheel on the countershaft, an operating handle journalled on the countershaft, a two pointed pawl pivoted to said handle and cooperating with the ratchet wheel whereby the parts may be actuated to transmit motion to the first mentioned shaft, means to prevent retrograde movement of the parts, a platform, and means to support said platform from said first mentioned shaft so as to move with the latter.

2. The structure set forth in claim 1 in connection with a manually operable toe piece adjustably connected to the platform.

3. A hand truck including a wheel supported body, frame members on said body, bearings at the upper ends of said frame members, a shaft journalled in said bearings, a countershaft also journalled in bearings on said frame members, a gear on the first mentioned shaft, a pinion on the countershaft meshing with said gear, a ratchet wheel on the countershaft, an operating handle journalled on the countershaft, a two pointed pawl pivoted to said handle and cooperating with the ratchet wheel whereby the parts may be actuated to transmit motion to the first mentioned shaft, means to prevent retrograde movement of the parts, a platform, means to support said platform from said first mentioned shaft so as to move with the latter, and a foldable strut pivoted on the truck frame and adapted, when in operative position, to project beyond an end of the truck for engagement with the surface supporting said truck to prevent tipping thereof during the unloading operations.

4. The structure set forth in claim 3 in connection with cleats on the sides of the platform whereby suitable securing means may be fastened to hold articles on said platform.

5. A truck comprising, in combination, a body, wheels supporting said body and adapted to swing in any position according to the direction in which the truck is moved, frame members on said body, bearings at the outer ends of said frame members, a shaft journalled in said bearings, plural sockets fixed to said shaft, a platform, sockets carried by said platform, rods set in the sockets on the platform and the plural sockets on the shaft, manually operated means to rotate said shaft to move the platform from the vertical to the horizontal position and vice versa, means to temporarily brace the truck to prevent tipping thereof, and means adjustably connected with the platform whereby articles will be supported in certain positions on said platform and when said means is withdrawn the articles will be displaced.

In testimony whereof, I have hereunto affixed my signature.

JOSEPH CHVOJKA.